Nov. 20, 1951 C. AMBRETTE 2,576,061
CONVERTIBLE CONTINUOUS PRESS FOR PRODUCING
LONG OR SHORT ALIMENTARY PASTE PRODUCTS
Filed Nov. 21, 1946 2 SHEETS—SHEET 1
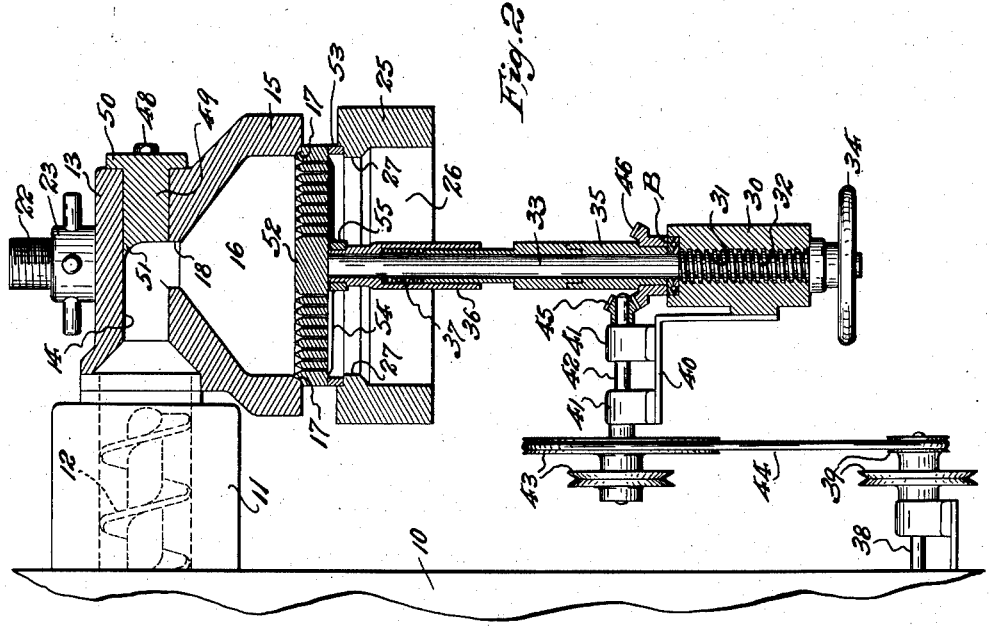
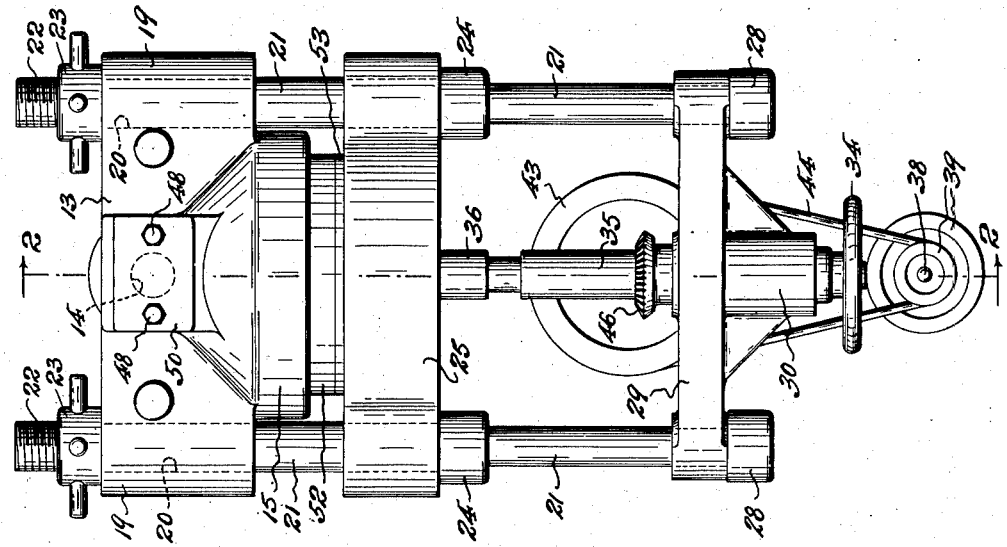
INVENTOR.
Conrad Ambrette,
BY George D. Richards
Attorney

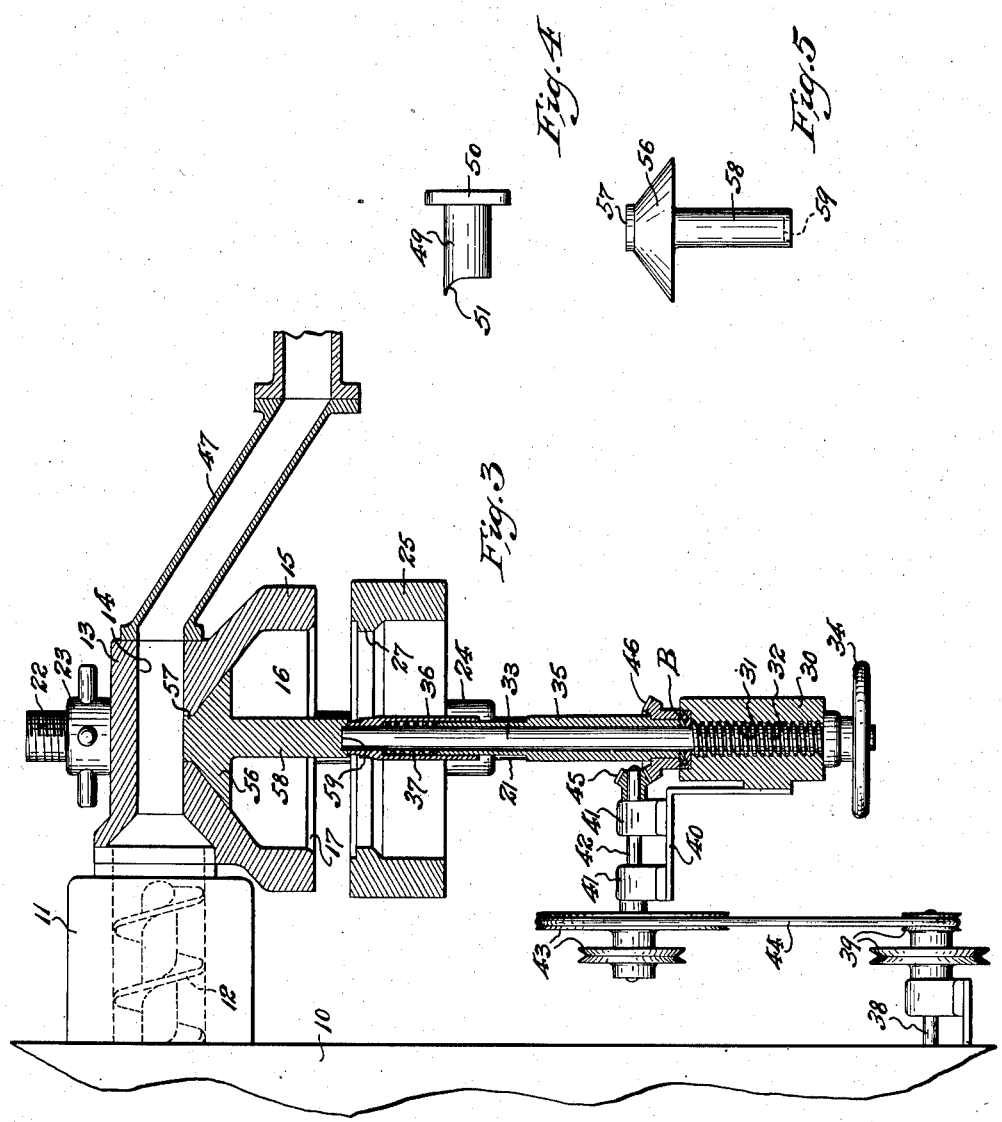

Patented Nov. 20, 1951

2,576,061

UNITED STATES PATENT OFFICE 2,576,061

CONVERTIBLE CONTINUOUS PRESS FOR PRODUCING LONG OR SHORT ALIMENTARY PASTE PRODUCTS

Conrad Ambrette, Brooklyn, N. Y.

Application November 21, 1946, Serial No. 711,344

4 Claims. (Cl. 107—14)

This invention relates to apparatus for producing alimentary paste products by a continuous method; and the invention has reference, more particularly, to novel means for quickly and easily converting continuous press apparatus for optional production of either long or short paste products.

In my copending application for United States Letters Patent Ser. No. 662,699, filed April 17, 1946, now Patent No. 2,481,274, dated September 6, 1949, I have disclosed a novel construction of continuous press apparatus for producing alimentary paste products; said press having means adapted to produce both long and short paste products. The present invention has for an object to provide novel means for quickly and easily arranging or changing over the apparatus, whereby to condition the same, at the option of the user, for the production of either long or short paste products, and, to this end, to provide means for shutting off flow of paste to a short paste extrusion head while permitting the paste to flow to the long paste extrusion head, and, vice versa, for shutting off flow of paste to the long paste extrusion head while permitting the paste to flow to the short paste extrusion head.

The invention has for a further object to provide a discharge head leading from a dough or paste mixing means and a discharging press screw, said discharge head having a main discharge passage adapted to be connected with detachable means for distributing the dough or paste to a long paste extrusion head, and a branch discharge passage adapted to be connected with a short paste extrusion head; said short paste extrusion head being disposed to depend from said discharge head and including a removable die and cooperative paste cutting knife, means to actuate the knife, and a manipulatable jack screw which is operable to hold a removable shut-off plug in closed relation to the branch passage of the discharge head when the die and cooperative cutting knife is removed, whereby to put the short paste extrusion head out of service when dough or paste is to be delivered to the long paste extrusion head; an additional removable shut-off plug being provided for closing the outlet of the main passage of the discharge head to put the long paste extrusion head out of service when the branch passage is opened for delivery of paste to said short paste extrusion head.

Other objects of this invention, not at this time more particularly enumerated, will be understood from the following detailed description of the same.

An illustrative embodiment of the invention is shown in the accompanying drawings, in which:

Fig. 1 is a front elevational view of the press parts with which this invention deals as arranged for production of short paste products; and Fig. 2 is a longitudinal vertical section, taken on line 2—2 of Fig. 1.

Fig. 3 is a longitudinal vertical section, similar to that of Fig. 2, but showing the short paste extrusion head as arranged in out of service condition, while paste is discharged for delivery to a long paste producing means of the press.

Fig. 4 is a detail side elevational view of a closure plug for closing the outlet of the main passage of the discharge head against flow of paste to long paste producing means; and Fig. 5 is a detail side elevational view of a closure plug for closing the branch passage of the discharge head against flow of paste to the short paste producing means.

Similar characters of reference are employed in the above described views, to indicate corresponding parts.

Referring to the drawings, the reference character 10 indicates a suitable dough or paste mixing means having a discharging press screw housing 11 in which is mounted a suitably driven rotated press screw 12. Disposed in connection with the outlet end of said press screw housing 11 is a suitably supported discharge head 13 which is provided, for extension through the interior thereof, with a main paste discharge passage 14, which leads from outlet end of said press screw housing 11. Paste is fed, under pressure, by said press screw 12 from the mixing means 10 into said discharge passage 14 for discharge therethrough.

At its lower side, said discharge head 13 is provided with a short paste extrusion head 15, the same being preferably formed as an integral part of said discharge head. Said short paste extrusion head is provided with a downwardly open paste receiving chamber 16 of conical shape, and said short paste extrusion head is further formed to provide a die seat 17 around the margin of the open bottom of said chamber 16. Said discharge head 13 is also provided with a branch paste discharge passage 18, which leads downwardly from its main discharge passage 14 into said chamber 16 of the short paste extrusion head 15.

Extending laterally from said discharge head 13, respectively from its opposite sides and as integral parts thereof, are hanger arms or extensions 19, which extend beyond and so as to overhang the bottom part of said extrusion head 15. Slidably engaged through perpendicular ways 20, with which said hanger arms or extensions are provided, are suspension bars 21. The upper end portions of said suspension bars 21, which project from the top of said discharge head, are provided with external screw-threads 22, and threaded thereon are hanger nut members 23 which bear against the top of said discharge head 13. Supported by and between intermediate portions of said suspension bars 21, by collars 24 with which said bars are provided, is a die platen 25 having a central opening 26 which is opposed to and aligned with the bottom opening of said extrusion head chamber 16. Said die platen is provided with an internal annular supporting flange or shoulder member 27 which is downwardly offset within the upper end of the die platen opening 26. Also supported by and between the lower end portions of said suspension bars 21, by collars 28, with which said bars are provided, is a bridge member or yoke 29 provided with a central perpendicular boss 30 having an internally screw-threaded axial bore 31. Said bore of the boss 30 is aligned with the axis of said die platen opening 26 and extrusion head chamber 16. Threaded through the bore 31 of said boss 30 is the screw-threaded section 32 of a jack screw which is provided with a smooth body 33 disposed to extend upwardly from said bridge member or yoke 29 into the opening 26 of the die platen 25. Said jack screw is provided with a hand wheel 34 on its lower exterior end, whereby the same may be manipulated.

Supported by a thrust bearing B, which is mounted in the upper end of said boss 30, is a drive sleeve or hollow shaft member 35 adapted to rotate about the body 33 of the jack screw for transmission of operating power to a rotary short paste cutting means to be hereinafter described. Mounted on the upper end of said sleeve or hollow shaft member 35, to rotate therewith, is an axially yieldable section 36 adapted to be upwardly urged by a compression spring 37 which is interposed between the same and said sleeve or hollow shaft member.

Suitable power transmission for driving said sleeve or hollow shaft member from a power source is provided. An illustrative form of such power transmission comprises a drive shaft 38, which e. g. may be suitably driven from the same power source which drives the operative mechanism (not shown) of the dough or paste mixing means and its press screw 12; said drive shaft 38 being provided with drive pulleys 39, which are selectively usable according to the speed at which the sleeve or hollow shaft member 35 and cutting means actuated thereby is desired to be driven. Supported by a bracket 40, which is affixed to and which extends from the boss 30 of the bridge member or yoke 29, are bearings 41, in which is journaled a countershaft 42. Said countershaft 42 is provided with driven pulleys 43, which are selectively driven by a belt 44 from a selected pulley 39, according to speed at which said sleeve or hollow shaft member 35 and cutting means actuated thereby is desired to be driven. Fixed on the inner end of said countershaft 42 is a driving bevel gear 45 which meshes with and drives a driven bevel gear 46 which is fixed on the sleeve or hollow shaft member.

The reference character 47 indicates the feeder section which, when the press is to be utilized for production of long paste products, delivers paste from the discharge head 13 to means for distributing the paste to a long paste extrusion head not shown, but which is fully disclosed and described in my aforesaid pending application for patent Ser. No. 662,699. When in use, the receiving end of said feeder section 47 is bolted to the discharge head 13 by bolts 48, whereby to connect the same in communication with the outlet end of the main paste discharge passage 14 of said discharge head.

When it is desired to utilize the continuous press for the production of short paste products, said feeder section 47 is disconnected from the discharge head 13, and a closure plug 49 is inserted in the outlet end of said main paste discharge passage 14 of said discharge head, and then secured to the latter by the bolts 48, which are passed through the flanged outer end portion 50 of said plug (see Figs. 1 and 2). Preferably, the inner end of said closure plug 49 is provided with a deflector lip formation 51 which is provided with a curved face extending between the top side of said main paste discharge passage 14 to the outer or far side of the branch discharge passage 18 of the discharge head (see Fig. 2).

Preparatory to use of the short paste extrusion head 15 the branch paste discharge passage 18 of the discharge head 13 is opened, and a short paste extrusion die plate 52 is mounted across the open bottom of the chamber 16 of said extrusion head, so as to seat against the die seat 17 with which the latter is provided. Said die plate 52 is held in such operative relation to the extrusion head 15 by the supporting flange or shoulder 27 of the die platen 25, by raising the latter into such supporting position. If desired, an auxiliary supporting ring 53 may be interposed between said flange or shoulder 27 of the die platen 25 and the underside of the die plate 52. In the meantime, a cutting knife 54 is affixed by its hub 55 to the free end of the yieldable section 36 of the sleeve or hollow shaft member 35, whereby the blade or blades of said knife are caused to operatively slidably contact the under face of the die plate, so as to move across the apertures of the latter when the knife is rotated by the drive of the operated sleeve or hollow shaft member 35. The jack screw 32—33 is preferably turned up to thrust against the bottom of the die plate 52, whereby to add the support of said jack screw to the latter, and so as to furnish firm support for the rotated sleeve or hollow shaft 35 and its yieldable section 36 (see Fig. 2). The press is now ready to produce short paste products, and, to such end, the feed screw 12 will force paste from the mixing means 10 into and through the communicating portions of the main and branch paste discharge passages 14 and 18 of the discharge head 13, whereby to fill the extrusion head chamber 16 with paste under pressure, so that said paste will be extruded therefrom through the apertures of the die plate 52, and will be cut away from the die plate by the rotating knife 54 so as to be discharged from the extrusion head in desired short paste product form.

When it is desired to utilize the continuous press for the production of long paste products, the closure plug 49 is disconnected from the discharge head 13 and removed, whereupon the feeder section 47 is connected with the latter in communication with the outlet end of the main paste discharge passage 14 thereof. This having been done, the short paste extrusion head 15 is put out of service and the branch passage 18 of the discharge head 13, which leads to the chamber 16 of said extrusion head 15, is closed. To accomplish this, the hanger nut members 23 are turned up along the screw-threaded ends 22 of the suspension bars 21, thus allowing the latter to slide downward through the ways 20 of the hanger arms or extensions 19 of the discharge head 13. Such downward movement of the suspension bars 21 lowers both the die platen 25 and the bridge member or yoke 29, and parts supported by the latter, relative to the extrusion head 15, thus withdrawing the die plate 52 from its operative seated relation to the seat 17 of said extrusion head, so that said die plate may be removed from its operative assembled relation to the latter, together with the auxiliary supporting ring 53. In addition to such removal of the die plate 52, the knife 54 is also disconnected and removed from the yieldable section 36 of the sleeve or hollow shaft member 35. Upon removal of the die plate and knife, the jack screw 32—33 is turned down through the boss 30 so as to lower its upper free end sufficiently to permit introduction of means adapted to close off the paste branch passage 18 which leads from the main paste discharge passage 14 of the discharge head 13 into the interior of the extrusion head chamber 16.

The means for closing said branch passage 18 of the discharge head comprises an extrusion head closure plug formed by a conical body 56 which conforms to the conical shape of the upper interior of the extrusion head chamber 16. Projecting axially from the apex end of said conical body 56 of the closure plug is a plug section 57 which is shaped to fit into the interior of said branch passage 18 of the discharge head 13. Extending downwardly from said conical body 56 of the closure plug is an axial stem portion 58, which is provided in its free end with a receiving socket 59 adapted, at the proper time, to receive and seat the free extremity of the jack-screw 32—33 in holding relation to the closure plug.

To apply the extrusion head closure plug in operative assembled relation to said extrusion head, said closure plug is passed upwardly through the open bottom of the extrusion head chamber 16 until its conical body 56 is stopped against the upper end of said chamber, and its plug section 57 entered in the branch passage 18 of the discharge head 13 so as to close said passage. When the closure plug is thus operatively positioned, the jack screw 32—33 is turned up through the boss 30 until the free extremity of the jack screw engages in the receiving socket 59 of the closure plug stem portion 58, whereupon the jack screw is turned strongly home to thrust the closure plug tightly home in the extrusion head 15, so as to be thereby unyieldingly held in closed relation to the branch passage 18 against paste pressure (see Fig. 3). When the extrusion head is thus put out of service condition, it will be obvious that paste emitted by the press screw 12 from the mixing means 10 will flow directly through the main paste discharge passage 14 of the discharge head 13, and thence through the feeder section 47, and distributing means served thereby, to the long paste extrusion head of the press.

From the above it will be understood that the instant invention provides a novel short paste producing attachment for a continuous press of the general type and kind disclosed in my aforesaid copending application for Letters Patent Ser. No. 662,699, and which may be easily and quickly put into service or out of service condition, accordingly as it may be desired to utilize the press for production of short or long paste products.

I am aware that changes could be made in the above described constructions without departing from the scope of this invention as defined by the following claims. It is therefore intended that all matter described in the foregoing specification and shown in the accompanying drawings shall be interpreted as illustrative and not in a limiting sense.

I claim:

1. An alimentary paste production apparatus comprising means to continuously issue a stream of paste under pressure into a discharge head, outlets from said head, removable plugs selectively applicable to said outlets whereby one of said outlets for feeding paste to a long paste producing means may be closed to direct said paste through a second one of said outlets, a removable short paste producing die mounted on the discharge head in communication with said second outlet, and manipulatable means dependent from the discharge head for removably holding said die or the closure plug for the second one of said outlets, as the case may be, in assembled relation.

2. An alimentary paste production apparatus according to claim 1, wherein said manipulatable holding means includes a vertically movable jack screw adapted to engage and support the die or said last mentioned closure plug as the case may be.

3. An alimentary paste production apparatus comprising means to continuously issue a stream of paste under pressure into a discharge head, outlets from said head, removable plugs selectively applicable to said outlets whereby one of said outlets for feeding paste to a long paste producing means may be closed to direct said paste through a second one of said outlets, a plurality of suspension bars dependent from the discharge head, a die platen supported by said suspension bars below said head, a bridge bar also supported by said suspension bars below and in spaced relation to the die platen, said bridge bar having an internally screw-threaded boss, a manipulatable jack screw threaded through said boss to extend upwardly through the die platen, means cooperable with the discharge head for raising and lowering the suspension bars and the die platen and bridge bar carried thereby, a removable short paste producing die adapted to be carried by the die platen in opposition to the discharge head for communication with the second outlet of the latter, said jack screw being adapted to engage and support the die or the closure plug for said second outlet of the head, as the case may be, a rotary short paste cutting means cooperative with the die, and power transmission means for said cutting means supported by the bridge bar so as to be movable therewith.

4. An alimentary paste production apparatus according to claim 3 wherein said power transmission means includes a hollow shaft rotatable about the upper portion of the jack screw, said shaft terminating in an axially yieldable section by which the cutting means is carried and pressed into operative contact with the die.

CONRAD AMBRETTE.

REFERENCES CITED

The following references are of record in the file of this patent:

UNITED STATES PATENTS

| Number | Name | Date |
|---|---|---|
| 752,241 | Master | Feb. 16, 1904 |
| 1,172,400 | Specht et al. | Feb. 22, 1916 |
| 1,205,710 | Cavagnaro | Nov. 21, 1916 |
| 1,426,244 | Barducci | Aug. 15, 1922 |
| 1,732,463 | Fegles | Oct. 22, 1929 |
| 2,257,695 | Lihotzky | Sept. 30, 1941 |